US006399197B1

(12) United States Patent
Kanamori et al.

(10) Patent No.: US 6,399,197 B1
(45) Date of Patent: Jun. 4, 2002

(54) MONOFILAMENT AND PROCESS FOR PRODUCING THE SAME

(75) Inventors: Takeshi Kanamori, Otsu; Hiroshi Urayama, Kyoto; Yoshiyuki Ohara, Kato-gun; Tameyuki Nagano, Sumoto, all of (JP)

(73) Assignees: Shimadzu Corporation, Kyoto; Gosen Co., Ltd., Osaka, both of (JP)

( * ) Notice: Subject to any disclaimer, the term of this patent is extended or adjusted under 35 U.S.C. 154(b) by 0 days.

(21) Appl. No.: 09/559,419

(22) Filed: Apr. 26, 2000

(30) Foreign Application Priority Data

May 21, 1999 (JP) .......................................... 11-141413

(51) Int. Cl.[7] ........................... B32B 27/02; C08L 67/04

(52) U.S. Cl. ....................... 428/378; 428/395; 525/411; 525/415

(58) Field of Search ................................ 525/411, 415; 428/378, 395

(56) References Cited

U.S. PATENT DOCUMENTS 5,705,181 A * 1/1998 Cooper ....................... 424/426
5,716,376 A * 2/1998 Roby ......................... 606/228
5,997,568 A * 12/1999 Liu ........................... 606/228

FOREIGN PATENT DOCUMENTS

| | | |
|---|---|---|
| EP | 0826803 A2 | 3/1998 |
| JP | 07090715 | 4/1995 |
| JP | 10110332 | 4/1998 |

OTHER PUBLICATIONS

Abstract of Japanese Patent. No. 10110332; dated Apr. 28, 1998.

* cited by examiner

*Primary Examiner*—Patricia A. Short
(74) *Attorney, Agent, or Firm*—Rader, Fishman & Grauer

(57) ABSTRACT

The object of the present invention is to provide a monofilament which has sufficient mechanical strength to be practically used also as a string for rackets and which is excellent in workability. Disclosed is a monofilament which is formed by extruding a material prepared by blending mainly a polylactic acid type polymer (A) and an aliphatic polyester (B) other than polylactic acid, and drawing the extruded material. This could be used as a racket string which has a tenacity-elongation curve similar to that of natural gut and is excellent in water resistance and heat resistance.

35 Claims, No Drawings

MONOFILAMENT AND PROCESS FOR PRODUCING THE SAME

BACKGROUND OF THE INVENTION

1. Field of the Invention

The present invention relates to a monofilament which decomposes in the natural environment, which is excellent in heat stability and forming workability, which has high mechanical strength, particularly knot strength and longitudinal cracking resistance, and which is suitable for products typified by strings for tennis rackets.

2. Description of the Related Art

In the recent years, from the viewpoint of natural environmental protection, a biodegradable polymer and its processed product, which decompose in the natural environment, are required and studies on naturally degradable resins such as an aliphatic polyester are done actively. In particular, one of these examples, a polylactic acid, potentially has a heat of combustion not more than half of that of polyethylene, and is naturally hydrolyzed under the ground or in water and thereafter converted by microorganisms into harmless decomposed products. Studies for obtaining formed articles, specifically films, sheets, fibers and the like, using polylactic acid are being made. Polylactic acid can be improved in its strength by stretching. However, since polylactic acid is a hard and brittle material, it is poor in flexibility and usability and also in longitudinal cracking resistance and knot strength. Polylactic acid is not practical, therefore.

On the other hand, an aliphatic polyester composed of a polycondensation product from an aliphatic polyfunctional carboxylic acid and an aliphatic polyfunctional alcohol is an example of flexible, naturally degradable resins.

For example, Japanese Patent Publication (B2) No. 2851478 reports that a monofilament excellent in heat stability and mechanical properties can be obtained by using, as a biodegradable monofilament, an aliphatic polyester which has been prepared by increasing, with a coupling agent, a molecular weight of a relatively high molecular weight polyester prepolymer having a hydroxyl group on terminal of molecule which mainly contains a polyester obtained by reacting two components of a glycol and a polybasic acid (or anhydride thereof), and if necessary as a third component, at least one polyfunctional component selected from tri- or tetra-functional polyhydric alcohols, oxycarboxylic acids and polyvalent carboxylic acids (or anhydride thereof).

Japanese Laid-open Patent Publication No. 10-110332 (1998) reports that a monofilament suitable for a fishline can be obtained by melt-spinning a blend polymer containing at least one species of polyalkylene dicarboxylate having a melting point of not lower than 70° C. as a first component and at least one species selected from polylactic acid, a copolymer of polylactic acid and a poly(β-hydroxyalkanoate) as a second component in the range of (the first component)/ (the second component) weight ratio of 95/5–40/60.

However, the aliphatic polyesters obtained by these methods are flexible and low in tensile strength and exhibit great elongation, in general.. Therefore, there are problems on their practical use as monofilaments such as strings for rackets or fishlines. Moreover, since they contain much materials of relatively low melting points, they may cause problems of fusion due to frictional heat and scuffing due to rubbing, and therefore are not practical.

The strings for rackets means strings to be used for rackets for tennis, soft tennis, badminton, squash and racquetball.

Heretofore, a string for a racket has been called gut. Gut is literally made of gut of sheep or cow and has still been used by some players typified by professional players at present because of its overall playability feeling and the like. Particularly in soft tennis, whale tissue has been used in stead of gut for tennis and occupies a position similar to gut.

These have advantages in ball-hitting sounds, creep property and the like in addition to overall playability feeling, but also have disadvantages of poor water resistance, high price and the like.

For these reasons, strings made of synthetic fibers, particularly polyamide-type synthetic fibers, are now in the mainstream in the world. This is because the problems of low water resistance and high price, which are drawbacks of natural gut, can be overcome and they are excellent in durability when repeatedly used.

By the way, overall playability, durability and ease of stringing are three important properties required of strings for rackets. Lacking any one of these properties breaks their practical usability.

The overall playability, which is mainly resilience at hitting ball, includes feelings such as ball-holding feeling and soft feeling following vibration, and ball-hitting sounds. The durability includes both durability against wear in repeated use and retentiveness of tension of a string face. The ease of stringing is ease to install a string to a racket.

It has been well known that when aliphatic polyesters relating to the present invention as well as aromatic polyesters are applied for strings for rackets, good overall playability can be obtained as predicted from their tenacity-elongation curves. However, there are two problems about durability, that is, problems on the face tension retentiveness and on longitudinal cracking of filament which takes place at the time of tightening a string with a clamp or the like when the string is installed to a racket. That is, this means that there has been two problems in the important characteristics.

Thinking that overcoming these two problems can make the polyesters excellent materials as a material for strings for rackets in association with their biodegradability, the present inventors have made intensive studies and have accomplished the present invention.

SUMMARY OF THE INVENTION

The object of the present invention is to provide a monofilament which has sufficient mechanical strength to be practically used also as a string for rackets and which is excellent in workability.

The present inventors eagerly studied in order to solve such problems, and have found that the above object can be accomplished by extruding a material prepared by blending mainly a polylactic acid type polymer and an aliphatic polyester other than polylactic acid in a predetermined proportion and drawing the extruded material.

That is, the present invention is a monofilament formed by extruding a material prepared by blending mainly a polylactic acid type polymer and an aliphatic polyester other than polylactic acid and drawing the extruded material.

Moreover, the present invention is a monofilament formed by extruding a material prepared by blending mainly a polylactic acid type polymer and an aliphatic polyesters other than polylactic acid in a blending ratio in weight of 95/5–61/39 and drawing the extruded material.

Furthermore, the present invention includes:

the monofilament wherein at least two species of the aliphatic polyesters other than polylactic acid are contained;

the monofilament wherein the aliphatic polyesters other than polylactic acid are mainly composed of an aliphatic carboxylic acid component and an aliphatic alcohol component, and/or an aliphatic hydroxycarboxylic acid component;

the monofilament wherein the polylactic acid and the aliphatic polyester other than polylactic acid have a crosslinked structure formed either in each of and/or between them;

the monofilament wherein the melting point of the aliphatic polyester other than polylactic acid is lower than that of the polylactic acid type polymer;

the monofilament wherein the drawing was conducted at temperatures not lower than the melting point of the aliphatic polyester other than polylactic acid;

the monofilament wherein the polylactic acid type polymer is oriented and the aliphatic polyester other than polylactic acid is not oriented;

the monofilament wherein the final draw ratio is 3–9 times; and the monofilaments wherein surfaces of the aforementioned monofilaments are covered with a polymer material such as an aliphatic polyester and a polyurethane.

Furthermore, the present invention is a process for producing a monofilament comprising extruding a material prepared by blending mainly a polylactic acid type polymer and an aliphatic polyesters other than polylactic acid in a blending ratio in weight of 95/5–61/39, and drawing the extruded material at a temperature not lower than the melting point of the aliphatic polyester other than polylactic acid.

Furthermore, the present invention includes:

the process for producing a monofilament wherein at least two species of the aliphatic polyester other than polylactic acid are used; and the process for producing a monofilament wherein the polylactic acid type polymer and the aliphatic polyester other than polylactic acid have a crosslinked structure formed either in each of and/or between them.

Moreover, the present invention includes strings for rackets, sutures, fishlines or strings for musical instruments consisting of these monofilaments and also includes strings for rackets, sutures, fishlines or strings for musical instruments using these monofilaments as a part of their structural members. The strings for rackets include strings to be used for rackets for tennis, soft tennis, badminton, squash and racquetball etc.

DETAILED DESCRIPTION OF THE INVENTION

The polylactic acid, aliphatic polyester other than polylactic acid and the like to be used in the present invention are explained step by step below.

In the present invention, a polylactic acid is a polymer composed substantially only of monomer units derived from L-lactic acid and/or D-lactic acid. The term "substantially" used herein means that the polylactic acid may contain other monomer units derived from neither L-lactic acid nor D-lactic acid unless the effect of the present invention is impaired.

As a method for producing the polylactic acid can be adopted arbitrary known polymerization methods. The most typically known method is one in which a lactide, which is an anhydrous cyclic dimer of lactic acid, is subjected to ring-opening polymerization (a lactide method), but lactic acid may be directly subjected to condensation polymerization.

In the case where the polylactic acid is composed only of monomer units derived from L-lactic acid and/or D-lactic acid, the polymer is crystalline and of high melting point. Furthermore, since the crystallinity and melting point thereof can be freely adjusted by changing a ratio of monomer units derived from L-lactic acid to those derived from D-lactic acid (abbreviated as an L/D ratio), a practical characteristic can be controlled depending upon uses.

Moreover, other hydroxycarboxylic acids or the like may be copolymerized unless the properties of polylactic acid are damaged.

Furthermore, for the purpose of increase in molecular weight or improvement in melt viscosity, a small amount of a chain elongating agent, a crosslinking agent and the like, such as diisocyanate compounds, epoxy compounds, acid anhydrides and peroxides, can be employed. A weight average molecular weight of the polymer is preferably in the range of 50,000 to 1,000,000. When it is less than this range, satisfactory mechanical properties and the like are not shown. When it exceeds that range, workability becomes poor.

In the present invention, the aliphatic polyester other than polylactic acid (henceforth, simply referred to as "aliphatic polyester") includes, for example, a polymer composed of an aliphatic carboxylic acid component and an aliphatic alcohol component and a polymer composed of an aliphatic hydroxycarboxylic acid component.

Examples of methods for producing the aliphatic polyester include a method wherein a high molecular weight product is obtained by directly polymerizing these components, and a indirect method wherein a high molecular weight product is obtained by polymerizing these components so as to form an oligomer and then using a chain elongation agent or the like.

An example of the aliphatic polyester to be used in the present invention is an aliphatic polyester made from a dicarboxylic acid and a diol. The aliphatic dicarboxylic acid may be compounds including succinic acid, adipic acid, suberic acid, sebacic acid and dodecanoic acid, or anhydrides or derivatives thereof.

On the other hand, the aliphatic diol can be generally exemplified by glycol-type compounds such as ethylene glycol, butanediol, hexanediol, octanediol and cyclohexanedimethanol, and derivatives thereof. Any of them are compounds having an alkylene, cyclic, or cycloalkylene group having 2 to 10 carbon atoms, which can be produced by condensation polymerization. For both of the carboxylic acid component and the alcohol component, two or more species may be used.

Moreover, for the purpose of forming a branch in a polymer in order to improve its melt viscosity, tri or more-functional polyvalent carboxylic acids, polyhydric alcohols or hydroxycarboxylic acids also may be used. When these components are used in large amounts, the resulting polymers may have crosslinked structures to lose thermoplasticity, or to form microgels partially having highly crosslinked structures even if the polymers are thermoplastic. Proportions of these tri or more-functional components contained in the polymers, therefore, are very small and they are contained in degrees such that chemical and physical properties of the polymers are not influenced very much. As such a polyfunctional components, malic acid, tartaric acid, citric acid, trimellitic acid, pyromellitic acid, pentaerythit or trimethylol propane can be used.

Among the producing methods, the direct polymerization method is a method in which the above-mentioned compounds are chosen and a high molecular weight product is obtained with removal of moisture which has been contained in the compounds or is generated during the polymerization.

The indirect polymerization method includes a method comprising choosing and polymerizing the above-mentioned compounds so as to form an oligomer and thereafter growing the oligomer to have a high molecular weight by using a small amount of a chain elongating agent, for example, a diisocyanate compound such as hexamethylene diisocyanate, isophorone diisocyanate, xylylene diisocyanate, diphenylmethane diisocyanate for the purpose of increasing a molecular weight, and a method wherein an aliphatic polyester carbonate is obtained by using a carbonate compound.

The other aliphatic polyesters to be used in the present invention include, for example, an aliphatic polyester composed of a condensation polymerization product of an aliphatic hydroxycarboxylic acid. Examples of the aliphatic hydroxycarboxylic acid include glycolic acid, β-hydroxybutyric acid, hydroxypivalic acid and hydroxyvaleric acid. Their condensation polymerization provides high molecular weight products. These aliphatic hydroxycarboxylic acids can be used in the form of their derivatives such as ester and cyclic ester. Ring-opening polymerization of the cyclic esters also gives high molecular weight products.

Moreover, when containing two or more kinds of aliphatic polyesters other than polylactic acid, the monofilament has characteristics excellent in knot strength and longitudinal cracking resistance. In particular, when the monofilament contains a polycaprolactone, the knot strength is more improved.

Preferable blending ratios by weight of the polylactic acid to the aliphatic polyester other than polylactic acid are 95/5 to 61/39. If the polylactic acid occupies 95% by weight or more, the knot strength can not be improved. On the other hand, if the polylactic acid is 61% by weight or less, defectiveness, such as difficulty in stringing when it is used as string, occurs because needed strength can not be achieved and also elongation is great.

Furthermore, since the polylactic acid and the aliphatic polyester other than polylactic acid have a crosslinked structure formed either in each of and/or between them, a heat resistant characteristic is improved, and even when a racket strung with string is left in a car in midsummer, the string is never cut. In addition, it is also important that reduction in face tension of string after stringing can be controlled more efficiently. Examples of available methods for introducing such a crosslinked structure to the polylactic acid and the aliphatic polyester other than polylactic acid include heretofore known methods e.g., a method comprising addition of tri or more-functional isocyanate compounds, epoxy compounds and acid anhydrides, a method using a radical generating agent such as peroxides, and a method comprising strong ultraviolet irradiation.

Next, a process for producing the monofilament of the present invention is explained.

First, although a method and a device for blending the polylactic acid and the aliphatic polyester are not particularly limited, ones which can work continuously are industrially advantageous and preferable.

For example, it is permitted that two or more kinds of pellets and various additives are blended in a predetermined proportion and are charged into a hopper of an extruding machine as they are, and thereafter they are molten and immediately formed into a monofilament. Moreover, it is also permitted that these ingredients are melt blended and thereafter formed into pellets in an intermediate step, and then the resulting pellets are molten and formed into a monofilament as needed.

Furthermore, it is also possible that the polylactic acid, the aliphatic polyester and the like are molten by an extruder or the like separately from each other, these are mixed in a predetermined proportion with a stationary mixer and/or a mechanical stirrer and immediately formed into a monofilament. Alternatively, the mixed material may be pelletized in an intermediate step. Mixing by mechanical stirring with an extruder or the like and a stationary mixer may be combined.

In order for uniform mixing, a method in which the mixture is pelletized in an intermediate step is preferable. But in the case of melt blending, substantial prevention from deterioration and degeneration of polymers and a copolymerization reaction due to a transesterification is required. Therefore, mixing is preferably conducted at a temperature as low as possible in a time as short as possible.

A melt extrusion temperature is selected adequately in consideration of melting points and a blending ratio of the resins to be used, but it generally ranges 100 to 250° C.

The monofilament of the present invention is generally circular in section, but may be in a hollow shape in which its core portion is vacant, or in a deformed shape such as a diamond shape and a star shape. A diameter of the monofilament is not particularly limited and may be determined depending on uses intended. For example, when it is used as a string for a racket, it may be set to approximately 0.6 mm to 1.60 mm.

When the aforementioned polylactic acid and aliphatic polyester other than polylactic acid are used in order for forming the monofilament according to the present invention, modification can be carried out by adding transesterification catalysts, various monomers, coupling agents, terminal treating agents, other resins, wood meal, starch and the like in addition to various additives such as modifires, fillers such as calcium carbonate, lubricants, ultraviolet absorbers, antioxidants, stabilizers, pigments, colorants, various fillers, antistatic agents, mold release agents, plasticizers, perfumes and antibacterial agents, as needed. Furthermore, if we do not stick to biodegradability, other general purpose polymers and the like may be added.

It is also important in the present invention that the drawing after extrusion forming is conducted at temperatures not lower than the melting point of the aliphatic polyester other than polylactic acid.

That is, when the drawing temperature is not higher than the melting point of the aliphatic polyester other than polylactic acid, the aliphatic polyester component other than polylactic acid is also drawn and oriented, and therefore satisfactory knot strength and longitudinal cracking strength can not be achieved.

The drawing is conducted by providing a wet drawing chamber and a dry heat drawing chamber having a far-infrared heater, an electric heater or the like as a heat source between rollers driven at different rotation speed, or by heating a non-drawn monofilament by transmitting heat from a heating roller located on the supplying side, and by setting a predetermined speed ratio between rollers. Although the speed ratio between rollers, that is, a draw ratio, is approximately 4 to 10 times in the present invention, it is more preferably 3 to 9 times in consideration of a balance between longitudinal cracking and strength due to the drawing orientation.

In the present invention, characteristics excellent in tenacity and elongation can be achieved by orienting the polylactic acid type polymer, and at the same time, both the knot strength and the longitudinal cracking resistance can be satisfied simultaneously by not orienting the aliphatic polyester other than polylactic acid.

A tensile tenacity-elongation curve of the monofilament of the present invention is similar to that of natural gut such as sheep casing and whale tissue and the monofilament can achieve an overall playability feeling similar to that of natural gut. This is also one of the features of the monofilament of the present invention.

Moreover, covering the surface of the aforementioned monofilament with a polymer material can provide luster to a string surface to enhance its appearance, and also can improve durability of string. The polymer material for covering is preferably an aliphatic polyester particularly in consideration of biodegradability. But if we do not stick to the biodegradability, covering is preferably conducted by using a variety of elastomers such as polyurethane from the viewpoint of durability of string and the like. Covering with mixtures of these resins are also available.

EXAMPLES

The present invention is explained by way of Examples and Comparative Examples in detail below, but the invention is not limited to these Examples.

In the Examples, weight average molecular weights (Mw) of polymers are values detected by GPC analysis and converted as polystyrene. Glass transition temperatures and melting points are values detected by measuring with a differential scanning calorimeter (DSC) at a rate of heating of 10° C./min.

The longitudinal cracking resistance in the present invention is determined by notching a monofilament at approximately a center of one end thereof with a cutter and ripping it, measuring a resistance at that time with a tensile tester, and indicating the resistance in gram. The monofilament subjected to the test had a diameter of about 1.3 mm. Separately, the monofilament was practically installed to a racket with a practical stringing machine, and a relation ship with longitudinal cracking which occurs at that time was investigated. This has confirmed that when the resistance is 25 g or more, no longitudinal cracking problem arises in the practical use of the string.

In the Examples, experiments were conducted using the following five kinds of raw materials:

<Polylactic Acid Type Polymer (A1)>

Poly L-lactic Acid

Lacty #5000 manufactured by Shimadzu Corp.

Mw=200,000; Glass transition point=60° C.; Melting point=175° C.

<Aliphatic Polyester (B1) Other Than Polylactic Acid>

Polybutylene Succinate

Bionolle #1001 manufactured by Showa Highpolymer Co., Ltd.

Mw=173,000; Glass transition point=−30° C.; Melting point=115° C.

<Aliphatic Polyester (B2) Other Than Polylactic Acid>

Polybutylene Succinate Adipate

Bionolle #3001 manufactured by Showa Highpolymer Co., Ltd.

Mw=179,000; Glass transition point=−45° C.; Melting point=90° C.

<Aliphatic Polyester (B3) Other Than Polylactic Acid>

Polycaprolactone

Celgreen PH7 manufactured by Daicel Chemical Industries, Ltd.

Mw=220,000; Glass transition point=−60° C.; Melting point=60° C.

<Resin for Surface Covering (U1)>

Polyurethane Elastomer

Miractran E598 manufactured by Nippon Miractran Co., Ltd.

Example 1

A polylactic acid type polymer (A1) and an aliphatic polymer (B2) other than polylactic acid were separately vacuum dried to a completely dried state, and then blended with a V-type blender in a blending ratio by weight (A1)/(B2)=90/10. The resultant was continuously fed to a 30 mm homodirectional twin-screw kneading extruder which had been set to 210° C. and melt extruded into a stand, which was then pelletized to yield a main raw material.

After bringing this main raw material to a completely dried state by vacuum drying, 4 parts by weight of sulfonamide type plasticizer as a lubricant, based on 100 parts by weight of the main raw material, was added to the resulting main raw material, and blended with a V-type blender. The resultant was fed to a single-screw melt extruder which had been set to 210° C. and extruded through a circular nozzle with a diameter of 3 mm. The extruded material was introduced to a cooling water bath placed directly below the nozzle and set to 50° C. with drawn by the first roller, and cooled to yield a non-drawn monofilament.

Immediately following this, the non-drawn monofilament was introduced the first drawing chamber which had been set to 100° C. and drawn by the second roller at a taking up speed ratio of 5.0 times.

Following this, the resulting monofilament was introduced to the second drawing chamber which had been set to 100° C. and drawn by the third roller at a taking up speed ratio of 1.7 times (the final draw ratio=8.5 times) and wound up by a winder. The resulting monofilament had a diameter of 1.30 to 1.40 mm.

The evaluation results are shown in Table 1.

Examples 2 to 4

A polylactic acid and an aliphatic polyester other than polylactic acid were blended under the conditions shown in Table 1, and then the resulting pellets were drawn to produce a monofilament by the same operations as those in Example 1. The evaluation results are shown in Table 1.

Examples 5 to 6

A surface of a monofilament obtained by the same operations as those in Example 1 was coated with a polymer material shown in Table 1 in a thickness of 30 $\mu$m by using a hot melt extruding machine. The evaluation results are shown in Table 1.

Examples 7 to 8

The same operations as those in Example 1 were repeated, provided that in the blending of polylactic acid type polymer (A1) and the aliphatic polyester (B2) or (B1) other than polylactic acid, 1.5 parts by weight of an epoxy compound: carboxylic acid glycidyl ester as a crosslinking agent, based on 100 parts by weight of (A1)+(B2) or (A1)+(B1), was incorporated to introduce a crosslinked structure into the polymer molecule. The resulting pellets were drawn to yield a monofilament. The evaluation results are shown in Table 1.

Comparative Example 1 to 4

A monofilament was produced by drawing a polylactic acid and an aliphatic polyester other than polylactic acid under the conditions shown in Table 1 by the same operations as those in Example 1. The evaluation results are shown in Table 1.

Furthermore, in Example 4 and Comparative Examples 1 to 4, rackets were practically strung with the resulting monofilaments respectively, and overall playability and ease of stringing were evaluated. In Examples 1, 7 and 8, heat resistance was also evaluated.

like that of a monofilament of polyamide but straight like that of a whale tissue and also its slope is gentle and a deflection at ball hitting is great.

Measurement of a relaxation of tension with time, which is another important characteristic of strings, has revealed that the monofilament of Example 4 has a remarkably improved relaxation of tension with time compared to that of the monofilament of Comparative Example 1. That is, as strung racket was treated at 40° C. for 30 minutes and further treated at 50° C. for 30 minutes and then measured its face tension. A reduction coefficient of face tension caused by the treatment was 21.1% compared to before the treatment and the relaxation was 78.9%. This is at a level standing comparison with 80.0% for a typical string for soft tennis which is made of polyamide and polyester.

When the monofilament of Comparative Example 1 was installed under the same conditions as those of Example 4, the portion tightened by the clamp and a twisted portion was longitudinally cracked and brought as if it was fibrillated. It was not recognized to be on a level to withstand practical use.

TABLE 1

| | A1 | B1 | B2 | B3 | Surface Covering | Crosslinking | Draw Ratio | Tensile Strength (kg) | Knot Strength (kg) | Longitudinal Cracking Resistance (g) | Relaxation in Face Tension (%) | Durability (collisions) |
|---|---|---|---|---|---|---|---|---|---|---|---|---|
| Example 1 | 90 | 0 | 10 | 0 | Not covered | Not crosslinked | 8.5 | 61.5 | 33.5 | 52 | — | 940 |
| Example 2 | 90 | 0 | 0 | 10 | Not covered | Not crosslinked | 8.5 | 68.9 | 34.9 | 45 | — | — |
| Example 3 | 90 | 10 | 0 | 0 | Not covered | Not crosslinked | 8.5 | 63.7 | 31.6 | 56 | — | — |
| Example 4 | 90 | 0 | 5 | 5 | Not covered | Not crosslinked | 8.5 | 68.2 | 37.1 | 74 | 78.9 | — |
| Example 5 | 90 | 0 | 10 | 0 | B2 | Not crosslinked | 8.5 | 63.1 | 31.3 | — | — | 1070 |
| Example 6 | 90 | 0 | 10 | 0 | U1 | Not crosslinked | 8.5 | 63.8 | 32.7 | — | — | 1150 |
| Example 7 | 90 | 0 | 10 | 0 | Not covered | Crosslinked | 6.5 | 53.7 | 30.5 | — | 80.3 | — |
| Example 8 | 93 | 7 | 0 | 0 | Not covered | Crosslinked | 6.0 | 58.3 | 29.8 | — | — | — |
| Comparative Example 1 | 0 | 0 | 0 | 0 | Not covered | Not crosslinked | 8.5 | 55.0 | 22.0 | 12 | 69.7 | 712 |
| Comparative Example 2 | 0 | 100 | 0 | 0 | Not covered | Not crosslinked | 8.0 | 62.4 | 30.0 | 25 | — | — |
| Comparative Example 3 | 0 | 0 | 100 | 0 | Not covered | Not crosslinked | 8.0 | 54.1 | 28.7 | 20 | — | — |
| Comparative Example 4 | 0 | 0 | 0 | 100 | Not covered | Not crosslinked | 8 0 | 48.7 | 20.0 | 17 | — | — |

As is clear from the Examples, it is shown that each of the monofilaments according to the present invention achieves well-balanced tensile strength, knot strength and longitudinal cracking resistance and has characteristics particularly suitable for strings for rackets.

A very small amount of silicon oil was applied to the monofilament (diameter=1.36 mm, elongation at cutting=18.2%) obtained in Example 4, and the resulting monofilament was cut into 10 m and made into a string for soft tennis.

The resulting monofilament was installed to a soft tennis racket with a tension of 40 pounds using an electric stringing machine. The string was tightened with a clamp, but it could be installed without causing any longitudinal cracking. The racket was subjected to test hitting by an advanced-level player, and was evaluated to be superior as a string for soft tennis to whale tissue, which has been placed in the top rank.

The reason of this seems to be that the strength-elongation curve of the monofilament of this Example is not S-shaped A relaxation of tension with time measured by the same method as in Example 4 was 69.7 %, which was lower than that of a monofilament made from polyamide. Also from this aspect, the monofilament of Comparative Example 1 was not on a level to withstand practical use.

When the strings of Comparative Examples 2 and 3 were installed to soft tennis rackets, their elongation were as great as about 40% and the strings were easily elongated particularly in a low loading region. As a result, the monofilaments were not able to be installed by a single yank and could be installed by two yanks. In addition, a part of the strings caused a longitudinal cracking phenomenon at their portions tighten by a clamp during the installation.

When a transverse string was installed, it wore due to its friction with a longitudinal string. The strings of Comparative Examples 2 and 3, therefore, were not on levels to withstand practical use as a string. The string prepared in Comparative Example 4 also behaved in the same manner and was not on a levels to withstand practical use.

In Examples 5 and 6, strings obtained after further surface smoothing treatment were installed to rackets with a tension of 60 pounds and durability was measured. That is, using a durability tester, an actual tennis ball was led to collide with the rackets (ball speed=100 km/hr) and the number of collisions before the strings were cut was counted.

The averages of three measurements in Example 5 and Example 6 were 1070 collisions and 1150 collisions, respectively, and it was found that they were improved in comparison with 712 collisions in Comparative Example 1 and 940 collisions in Example 1.

In Examples 7 and 8, strings obtained after further surface treatment were installed to soft tennis rackets with a tension of 40 pounds. These rackets were left stand at 70° C. for 24 hours and at 90° C. for additional 24 hours, and thereafter conditions of the strings were observed. No changes were recognized and there was no problem. By contrast, a racket which had been strung with the string prepared in Example 1 in the same manner was left stand at 70° C. for 24 hours, and this resulted in cutting of one of three strings. From this fact, an effect on improvement in heat resistance by a crosslinking agent was recognized.

Example 9

Using the raw materials used in Example 1, a hollow monofilament having a diameter of 0.31 mm and a hollow portion diameter of 0.16 mm was obtained by a method in which a gas was injected to the center of the nozzle. Using this monofilament as a core filament, three 1890-denier multifilaments made of nylon-6 and two 840-denier multifilaments also made of nylon-6 were wound around the monofilament with saturation with an ultraviolet rays curable resin. A string with a diameter of 1.21 mm was obtained after curing with ultraviolet irradiation.

The surface of the string was coated with nylon-6 resin in a thickness of 50 μm by a heat melt extruding machine. In addition, an oil which becomes liquid at ordinary temperature was injected into the hollow portion of the core filament, the both ends of which were thereafter closed with pins. The string after surface treatment had a diameter of 1.310 mm, a strength of 78.8 kg, a knot strength of 39.5 kg and an elongation of 19.8%.

This string was installed to a tennis racket with a tension of 60 pounds by using an electric stringing machine. No defective condition was caused. Furthermore, durability determined by the same method as that in Example 1 was 1405 collisions, and a face tension reduction coefficient was 18.5% and good.

Test hitting by an advanced-level player using this racket revealed that a playability feeling softer than that by strings entirely made of a multifilament, which has recently been well-received because of their soft playability feeling, can be enjoyed, thereby putting less load to an elbow, and it is an excellent string.

What is claimed is:

1. A monofilament which is formed by extruding a material prepared by blending a polylactic acid polymer (A) and an aliphatic polyester (B) other than polylactic acid, and drawing the material obtained by extruding, wherein each of the polylactic acid polymer (A) and the aliphatic polyester (B) other than polylactic acid, is crosslinked or wherein a crosslinked structure is formed between the polylactic acid polymer (A) and the aliphatic polyester (B) other than polylactic acid.

2. The monofilament according to claim 1, comprising a weight ratio of the polylactic acid polymer (A) and the aliphatic polyester B) other than polylactic acid, in a range of from 95:5 to 61:39.

3. The monofilament according to claim 1, comprising at least two species of the aliphatic polyester (B) other than polylactic acid.

4. The monofilament according to claim 1, wherein the aliphatic polyester (B) other than polylactic acid is an aliphatic carboxylic acid and an aliphatic alcohol or a hydroxycarboxylic acid or an aliphatic carboxylic acid, an aliphatic alcohol and a hydroxycarboxylic acid.

5. The monofilament according to claim 1, wherein at least one species of the aliphatic polyester (B) other than polylactic acid consists of a polycaprolactone.

6. The monofilament according to claim 1, wherein the melting point of the aliphatic polyester (B) other then polylactic acid is lower than that of the polylactic acid polymer (A).

7. The monofilament according to claim 1, wherein the drawing is conducted at a temperature not lower than the melting point of the aliphatic polyester (B) other than polylactic acid.

8. The monofilament according to claim 1, wherein the polylactic acid polymer (A) is oriented and the aliphatic polyester (B) other than polylactic acid is not oriented.

9. The monofilament according to claim 1, having a draw ratio of 3 to 9 times.

10. The monofilament according to claim 1, wherein the surface is covered with a polymer material (C).

11. The monofilament according to claim 10, wherein the polymer material (C) is a polylactic acid, an aliphatic polyester (B) other than polylactic acid or a polyurethane.

12. A process for producing a monofilament, the process comprising extruding a material prepared by blending a polylactic acid polymer (A) and an aliphatic polyester (B) other than polylactic acid, at a weight % ratio of from 95:5 to 61:39, and drawing the material obtained by extruding, at a temperature not lower than the melting point of the aliphatic polyester (B) other than polylactic acid, wherein each of the polylactic acid polymer (A) and the aliphatic polyester (B) other than polylactic acid, is crosslinked or wherein a crosslinked structure is formed between the polylactic acid polymer (A) and the aliphatic polyester (B) other polylactic acid.

13. The process according to claim 12, comprising at least two species of the aliphatic polyester (B) other then polylactic acid.

14. A string for rackets or musical instruments comprising a monofilament which is formed by extruding a material prepared by blending a polylactic acid polymer (A) and an aliphatic polyester (B) other than polylactic acid, and drawing the material obtained by extruding, wherein each of the polylactic acid polymer (A) and the aliphatic polyester (B) other than polylactic acid, is crosslinked or wherein a crosslinked structure is formed between the polylactic acid polymer (A) and the aliphatic polyester (B) other than polylactic acid.

15. The string for rackets or musical instruments according to claim 14, wherein the monofilament comprises a weight ratio of the polylactic acid polymer (A) and the aliphatic polyester B) other than polylactic acid, in a range of from 95:5 to 61:39.

16. The string for rackets or musical instruments according to claim 14, wherein the monofilament comprises at least two species of the aliphatic polyester (B) other than polylactic acid.

17. The string for rackets or musical instruments according to claim 16, wherein the aliphatic polyester (B) other than polylactic acid is an aliphatic carboxylic acid and an aliphatic alcohol or a hydroxycarboxylic acid or an aliphatic carboxylic acid, an aliphatic alcohol and a hydroxycarboxylic acid.

18. The string for rackets or musical instruments according to claim 14, wherein at least one species of the aliphatic polyester (B) other than polylactic acid consists of a polycaprolactone.

19. The string for rackets or musical instruments according to claim 14, wherein the melting point of the aliphatic polyester (B) other then polylactic acid is lower than that of the polylactic acid polymer (A).

20. The string for rackets or musical instruments according to claim 14, wherein the drawing is conducted at a temperature not lower than the melting point of the aliphatic polyester (B) other than polylactic acid.

21. The string for rackets or musical instruments according to claim 14, wherein the polylactic acid polymer (A) is oriented and the aliphatic polyester (B) other than polylactic acid is not oriented.

22. The string for rackets or musical instruments according to claim 14, wherein the monofilament has a draw ratio of 3 to 9 times.

23. The string for rackets or musical instruments according to claim 14, wherein the surface of the monofilament is covered with a polymer material (C).

24. The string for rackets or musical instruments according to claim 23, wherein the polymer material (C) is a polylactic acid, an aliphatic polyester other than polylactic acid, a polyurethane, or a combination thereof.

25. A string for rackets or musical instruments, wherein a monofilament comprises a part of a structural member thereof, wherein the monofilament is formed by extruding a material prepared by blending a polylactic acid polymer (A) and an aliphatic polyester (B) other than polylactic acid, and drawing the material obtained by extruding, wherein each of the polylactic acid polymer (A) and the aliphatic polyester (B) other than polylactic acid, is crosslinked or wherein a crosslinked structure is formed between the polylactic acid polymer (A) and the aliphatic polyester (B) other than polylactic acid.

26. The string for rackets or musical instruments according to claim 25, wherein the monofilament comprises a weight ratio of the polylactic acid polymer (A) and the aliphatic polyester B) other than polylactic acid, in a range of from 95:5 to 61:39.

27. The string for rackets or musical instruments according to claim 25, wherein the monofilament comprises at least two species of the aliphatic polyester (B) other than polylactic acid.

28. The string for rackets or musical instruments according to claim 25, wherein the aliphatic polyester (B) other than polylactic acid is an aliphatic carboxylic acid and an aliphatic alcohol or a hydroxycarboxylic acid or an aliphatic carboxylic acid, an aliphatic alcohol and a hydroxycarboxylic acid.

29. The string for rackets or musical instruments according to claim 25, wherein at least one species of the aliphatic polyester (B) other than polylactic acid consists of a polycaprolactone.

30. The string for rackets or musical instruments according to claim 25, wherein the melting point of the aliphatic polyester (B) other then polylactic acid is lower than that of the polylactic acid polymer (A).

31. The string for rackets or musical instruments according to claim 25, wherein the drawing is conducted at a temperature not lower than the melting point of the aliphatic polyester (B) other than polylactic acid.

32. The string for rackets or musical instruments according to claim 25, wherein the polylactic acid polymer (A) is oriented and the aliphatic polyester (B) other than polylactic acid is not oriented.

33. The string for rackets or musical instruments according to claim 25, wherein the monofilament has a draw ratio of 3 to 9 times.

34. The string for rackets or musical instruments according to claim 25, wherein the surface of the monofilament is covered with a polymer material (C).

35. The string for rackets or musical instruments according to claim 34, wherein the polymer material (C) is a polylactic acid, an aliphatic polyester other than polylactic acid, a polyurethane, or a combination thereof.

* * * * *